(12) United States Patent
Wade et al.

(10) Patent No.: US 10,642,042 B2
(45) Date of Patent: May 5, 2020

(54) LENS AND EMBEDDED OPTICAL ELEMENT FOR NEAR EYE DISPLAY

(71) Applicant: INTEL CORPORATION, Santa Clara, CA (US)

(72) Inventors: Andrew G. Wade, San Clemente, CA (US); Andrew Dawn, San Francisco, CA (US); Mickael Guillaumee, Neucha Tel (CH); David Ziegler, Lausanne (CH)

(73) Assignee: INTEL CORPORATION, Santa Clara, CA (US)

( * ) Notice: Subject to any disclaimer, the term of this patent is extended or adjusted under 35 U.S.C. 154(b) by 355 days.

(21) Appl. No.: 15/200,119

(22) Filed: Jul. 1, 2016

(65) Prior Publication Data
US 2018/0003973 A1    Jan. 4, 2018

(51) Int. Cl.
| | |
|---|---|
| *G02B 27/01* | (2006.01) |
| *B29D 11/00* | (2006.01) |
| *B29C 45/14* | (2006.01) |
| *G02B 5/32* | (2006.01) |
| *G03B 1/02* | (2006.01) |
| *G03H 1/04* | (2006.01) |
| *G03H 1/02* | (2006.01) |

(52) U.S. Cl.
CPC .......... *G02B 27/0172* (2013.01); *B29C 45/14* (2013.01); *B29D 11/0073* (2013.01); *B29D 11/00317* (2013.01); *G02B 5/32* (2013.01); *G02B 2027/0174* (2013.01); *G02B 2027/0178* (2013.01); *G03H 1/0272* (2013.01); *G03H 2001/0434* (2013.01); *G03H 2001/0439* (2013.01); *G03H 2270/54* (2013.01); *G03H 2270/55* (2013.01)

(58) Field of Classification Search
CPC .................. G02B 27/0172; G02B 5/32; G02B 2027/0178; G02B 2027/0174; B29C 45/14; B29D 11/0073; B29D 11/00317; G03H 2001/0439; G03H 1/0272; G03H 2001/0434; B60R 1/001
See application file for complete search history.

(56) References Cited

U.S. PATENT DOCUMENTS

| | | | | |
|---|---|---|---|---|
| 5,432,623 A | * | 7/1995 | Egan | G03H 1/22 351/41 |
| 5,776,286 A | * | 7/1998 | Yeh | G03H 1/20 156/256 |
| 2006/0012752 A1 | | 1/2006 | Chen | |
| 2006/0192306 A1 | | 8/2006 | Giller et al. | |
| 2008/0273246 A1 | | 11/2008 | Moliton et al. | |
| 2012/0147320 A1 | | 6/2012 | Legerton et al. | |
| 2013/0009853 A1 | * | 1/2013 | Hesselink | G02B 27/017 345/8 |
| 2017/0068095 A1 | * | 3/2017 | Holland | B29D 11/00317 |

OTHER PUBLICATIONS

International Search Report and Written Opinion received for PCT Patent Application No. PCT/US2017/035669, dated Aug. 21, 2017, 14 pages.

* cited by examiner

*Primary Examiner* — Kimberly N. Kakalec (57) ABSTRACT

Disclosed herein is a lens for a wearable projection system. The lens includes a holographic optical element embedded within the lens and covering a portion of the viewable area of the lens. The lens can be manufactured by providing a first lens blank, affixing the HOE to a portion of the first lens blank, and forming a second lens blank on the first lens blank to embed the HOE between the lens blanks.

16 Claims, 10 Drawing Sheets

LENS AND EMBEDDED OPTICAL ELEMENT FOR NEAR EYE DISPLAY

TECHNICAL FIELD

Embodiments herein generally relate to head worn displays and heads up displays; and in particular to lenses for such displays.

BACKGROUND

Modern display technology may be implemented to provide head worn displays (HWD) and to see through the display and to see information (e.g., images, text, or the like) in conjunction with the see through display. Such displays can be implemented in a variety of contexts, for example, defense, transportation, industrial, entertainment, wearable devices, or the like.

In particular, an image may be reflected off a transparent projection surface to a user's eye to present an image in conjunction with a real world view. Conventionally, HWD systems have extremely difficult tradeoffs between various design and utility considerations, such as, for example, bulk, form-factor, see-through quality, field of view, etc. For example, achieving a normal eyewear form factor without bulk has not been achieved in a commercial head mounted display.

DETAILED DESCRIPTION

Various embodiments may be generally directed to head worn displays (HWDs) and specifically to cast lenses for a head worn display. In general, HWDs provide a projection system and a lens that includes a holographic optical element (HOE). The projection system and the lens can be mounted to a frame to be worn by a user, for example, glasses, a helmet, or the like. During operation, the projection system projects an image onto an inside (e.g., proximate to the user) surface of the lens. The HOE reflects the image to an exit pupil (or viewpoint). Ideally, the exit pupil is proximate to one of the user's eyes, and specifically, to the pupil of the user's eye. As such, the user may perceive the reflected image.

Conventionally, the HOE is laminated onto an exterior surface of the lens. In particular, the HOE is laminated over an entire surface of the backside of the lens. The present disclosure provides to embed the HOE within the lens. In particular, the present disclosure provides that an initial lens half be formed. The HOE is applied, for example, using adhesive, or the like, to a portion of the initial lens half. For example, the HOE can be applied over a fraction (e.g., ⅛, ¼, ½, or the like) of the surface area of the backside of the initial lens half. The second lens half is formed on the initial lens half, thereby embedding the HOE within the complete lens.

In some examples, a number of registration marks can be formed on the initial lens half to aid in placing the HOE on the lens. More specifically, the HOE can be aligned onto the backside of the initial lens half based on the registration mark.

Reference is now made to the drawings, wherein like reference numerals are used to refer to like elements throughout. In the following description, for purposes of explanation, numerous specific details are set forth in order to provide a thorough understanding thereof. It may be evident, however, that the novel embodiments can be practiced without these specific details. In other instances, known structures and devices are shown in block diagram form in order to facilitate a description thereof. The intention is to provide a thorough description such that all modifications, equivalents, and alternatives within the scope of the claims are sufficiently described.

Additionally, reference may be made to variables, such as, "a", "b", "c", which are used to denote components where more than one component may be implemented. It is important to note, that there need not necessarily be multiple components and further, where multiple components are implemented, they need not be identical. Instead, use of variables to reference components in the figures is done for convenience and clarity of presentation.

Figure 1:
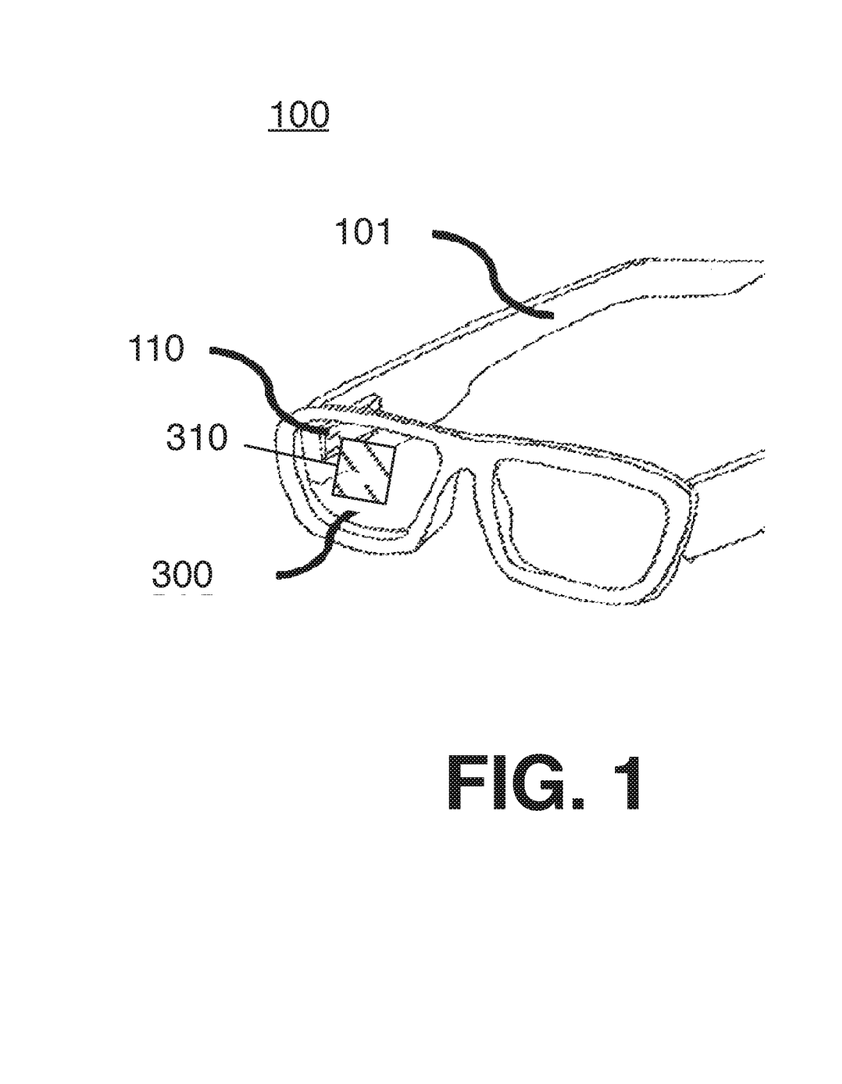
FIG. 1 illustrates an example first system.

FIG. 1 illustrates an example of device 100 arranged according to the present disclosure. It is noted, that the device of this figure is depicted implemented as a pair of glasses. However, with some examples, the device 100 may be embodied as a pair of glasses (e.g., as depicted), as a pair of binoculars, a monocular device (e.g., scope, or the like), as goggles, as a helmet, as a visor, as a wearable device, or the like. Embodiments are not limited in this context.

In general, the device 100 is configured to provide a virtual display. In some examples, the device 100 may provide a virtual display in conjunction with a real world view. The device 100 includes a glasses frame 101 and a projection system 110 mounted to the frame 101. Additionally, the device 100 includes a projection surface 300, which may be a lens, such as, for example, a glasses lens as depicted. For convenience and clarity in discussing the present disclosure, the projection surface 300 is referenced as lens 300. However, embodiments are not limited in this context.

The lens 300 can be removably mounted in the frame 101. The lens 300 includes an HOE 310 (also referred to as a holographic optical combiner). The HOE 310 may be in a particular location and/or have particular optical characteristics to selectively reflect light incident on the lens 300 to an exit pupil (e.g., the exit pupil 237 shown in FIG. 2).

During operation, the projection system 110 projects light onto the lens 300. The projected light can correspond to virtual images. The lens 300, and specifically the HOE 310, reflects (or redirects) the light towards a user's eye. More particularly the HOE 310 reflects the projected light (e.g., the projected image, or the like) to an exit pupil. This is described in greater detail with respect to FIG. 2. With some examples, the lens 300 and the HOE 310 redirect the projected images and also transmit light from the external environment to the user's eye. As such, a virtual image and a real world image may be presented to the user. It is noted, that although the device 100 is depicted with a single projection system 110 and lens 300, the device 100 may include a projection system 110 and lens 300 including an HOE 310 for each eye. Examples are not limited in this context.

With some examples, the projection system 110 may comprise a light source, battery, and projector to project images onto the HOE 310. For example, the projection system 110 may comprise a scanning mirror to reflect and redirect light from the light source onto the HOE 310. In some examples, the scanning mirror may be a microelectromechanical system (MEMS) based scanning mirror. In some examples, the projection system 110 may comprise a panel micro display (e.g., light emitting diode (LED) panel, liquid crystal display (LCD) panel, or the like). Additionally, the projection system 110 may include control and graphics processing components configured to cause the system 110 to emit light from the light source and to scan and/or project the emitted light onto the lens 300 to project an image onto the HOE 310.

The lens 300 is described in greater detail below, for example, with respect to FIG. 2 and FIG. 3. However, a general description of the lens 300 is given here. With some examples, the lens 300 is an at least partially transparent surface with the HOE 310 embedded within the lens 300. More specifically, the lens 300 includes the HOE 310 embedded within the lens 300 and covering only a portion (e.g., less than all of) the surface area of the lens 300. During operation, the lens 300 and the HOE 310 may transmit light incident on a real world side of the lens 300 to provide a real world view. In some examples, the lens 300 is opaque and the lens 300 does not transmit light incident on a real world side of the lens 300. The HOE 310 may be disposed in a particular location of the lens 300 and/or may have particular optical characteristics to reflect an image projected onto an internal surface of the lens 300 to an exit pupil in a particular location. With some examples, the lens 300 may be sunglass lenses to reduce an amount or type of light transmitted through the lenses, for example, by polarization or absorption. With some examples, the lenses 300 may be prescription lenses to correct or augment light perceived from the real world and/or the virtual image.

Figure 2:
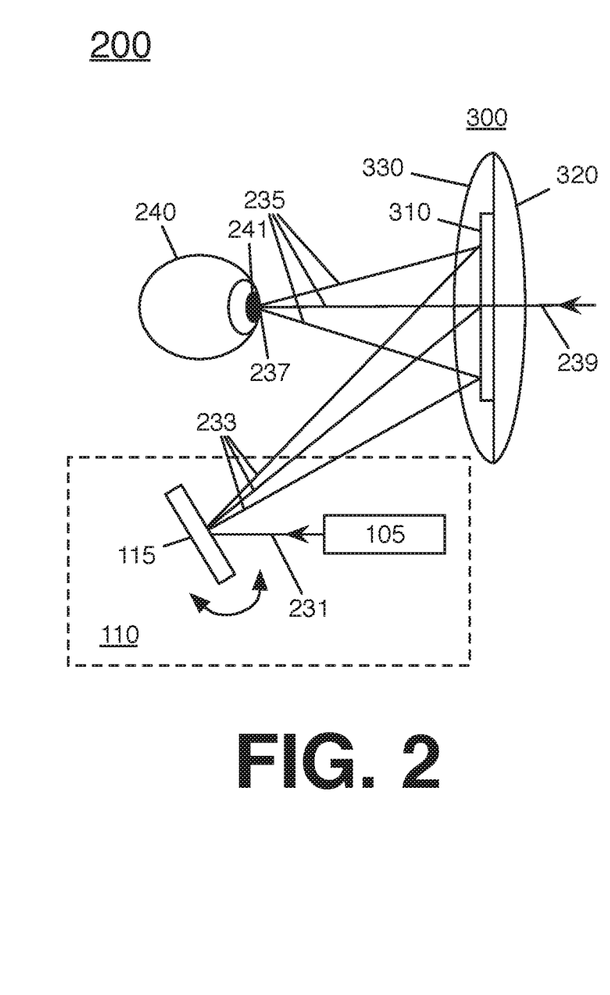
FIG. 2 illustrates an example second system.

For example, FIG. 2 is a block diagram illustrating a side view of a system 200 including an example implementation of the device 100. In general, the exemplary implementation of the device 100 depicted in this figure is configured to project light to an exit pupil 237 (e.g., proximate to, or directed at, a user's eye, or the like). That is, the device 100 is configured to reflect the image projected onto an HOE 310 to a virtual aperture (e.g., the exit pupil 237) in the optical system. The system 200 includes the projection system 110 including a light source 105 to emit a light beam 231 of at least one wavelength. Alternatively, the system 110 may receive light emitted from a source not included in the system. Examples are not limited in this context. The light beam 231 is incident on (or received by) a scanning mirror 115. The scanning mirror 115 rotates about a number of axes to scan the light beam 231 in angles 233.

The scanning mirror 115 scans the light beam 231 in angles 233 onto (or across) the lens 300 while the system 110 modulates or modifies the intensity of the scanned light beam 231 to correspond to a digital image. In particular, the scanning mirror 115 scans the light beam 231 over an area of lens 300 while the system 110 projects a digital image onto a portion of the area that includes the HOE 310.

The lens 300 comprises a first and a second lens half 320 and 330. In some examples, the lens halves 320 and 330 are referred to as lens blanks or lens portions. Embedded between the lens halves 320 and 330 is the HOE 310. It is important to note, that the lens halves 320 and 330 may not necessarily correspond to an exact half portion of the lens 300. For example, the first lens blank can correspond to more than half of the total volume of the lens 300 while the second lens blank can correspond to less than half of the total volume of the lens 300. Examples are not limited in this context. Furthermore, in some instances, the lens halves 320 and/or 330 are referred to as a frontside lens portion or a backside lens portion. However, reference to frontside or backside is not intended to imply an orientation with respect to a user's eye, but merely to describe the relationship between each lens half and the HOE embedded between the lens halves.

As depicted, the HOE 310 is embedded between the lens halves 320 and 330. It is noted, that a variety of styles of HOEs may be implemented as the HOE 310. Furthermore, the HOE 310 may be manufactured by any of variety of manufacturing techniques, such as, for example, recording a hologram into a medium. For example, the HOE 310 may be a combiner lens (e.g., a holographic optical combiner lens, or the like) that reflects light (e.g., off-angle light, or the like) incident on a first surface while transmitting light incident on a second opposite surface. Examples are not limited in this context.

Accordingly, during use, the lens 300 reflects the light 233 as diffracted light 235 to an exit pupil 237. Thus, the lens 300 reflects and diffracts the light 233 to the entrance pupil 241 of a user's eye 240. Furthermore, the lens 300, and particularly the HOE 310, transmits light 239, which is incident on a front side of the lens 300 and HOE 310. As depicted, the line of sight 243 of the eye (e.g., corresponding to the eye pupil 241) is aligned with the exit pupil 237 and with the light 239. As such, the user may perceive a virtual image (e.g., as projected to exit pupil 237) in conjunction with a real world view (e.g., corresponding to light 239).

It is noted, that although only a single input pupil (e.g., light beam 231) and a single exit pupil (e.g., the exit pupil 237) are depicted, embodiments may be implemented to receive multiple input pupils and project an image with multiple exit pupils (e.g., based on a single input pupil or from multiple input pupils). Examples are not limited in this context.

Figure 3:
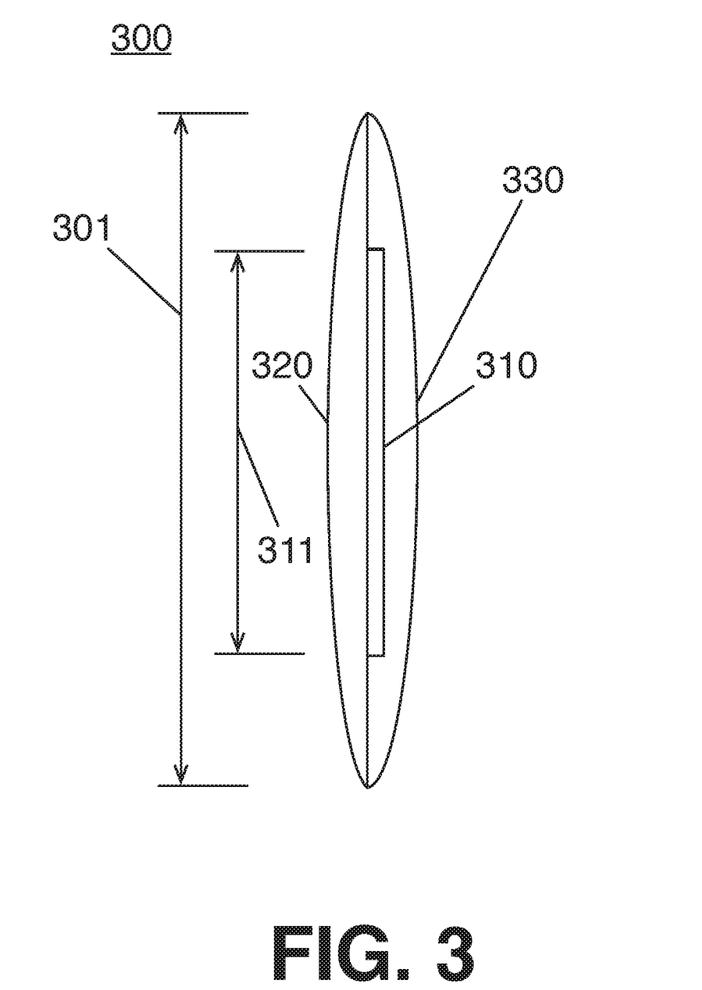
FIG. 3 illustrates an example lens for a projection system.

FIG. 3 illustrates a cut-away side view of the lens 300, arranged according to at least one example of the present disclosure. As depicted, the lens 300 includes a partial lens blank 320 and a backside lens portion 330. Embedded between the portions 320 and 330 is the HOE 310. Various techniques for manufacturing the lens 300, and particularly, embedding the HOE 310 between the portions 320 and 330 are described below, for example, with respect to FIG. 6. It is important to note, that the HOE 310 is disposed over only a portion of the surface area 301 of the lens 300. For example, as depicted in this figure, the HOE 310 covers area 311 of the lens 300, while the lens 300 has total viewable area 301. It is noted, that the area 311 is given for example only, and not to be limiting. Furthermore, areas 301 and 311 are only depicted by the dimension shown in this figure and not two dimensions, as the figure is a cut-away view as opposed to a perspective view (e.g., as shown in FIG. 1). In practice, the HOE 310 may cover any amount of the lens area, less than the total area 301. For example, the HOE 310 may cover area 311, where area 311 is between 4 and 12 times smaller than the area 301.

Furthermore, it is noted, that the HOE 310 may be positioned in a specific location within lens 300. Said differently, the HOE 310 may be aligned to a specific location in the viewable area 301 of the lens 300. This is described in greater detail below, however, for purposes of clarity, the HOE 310 may be embedded between the lens halves 320 and 330 to have a specific arrangement or alignment in the viewable area 301 of the lens 300. Accordingly, during use, the HOE 310 may reflect and/or diffract light as described above with respect to FIG. 2.

Figure 4:
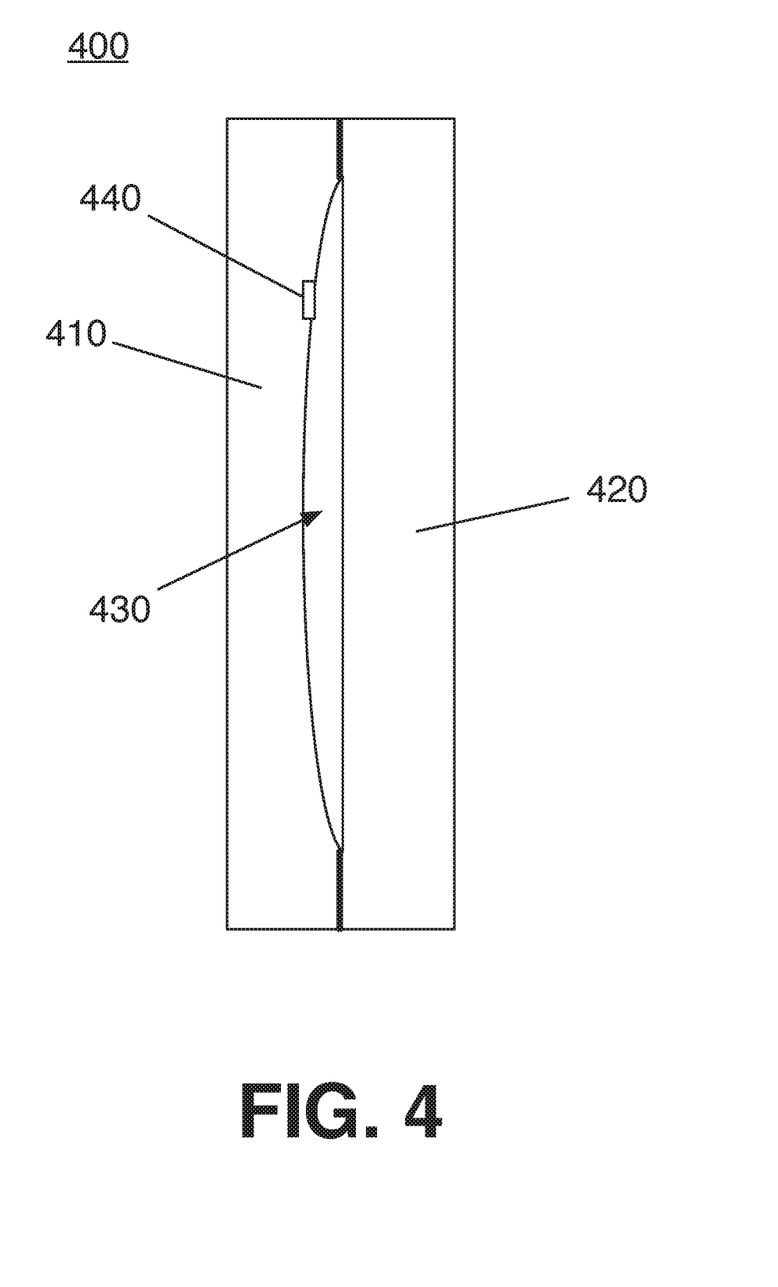
FIG. 4 illustrates an example first mold for manufacturing the lens of FIG. 3.
Figure 5:
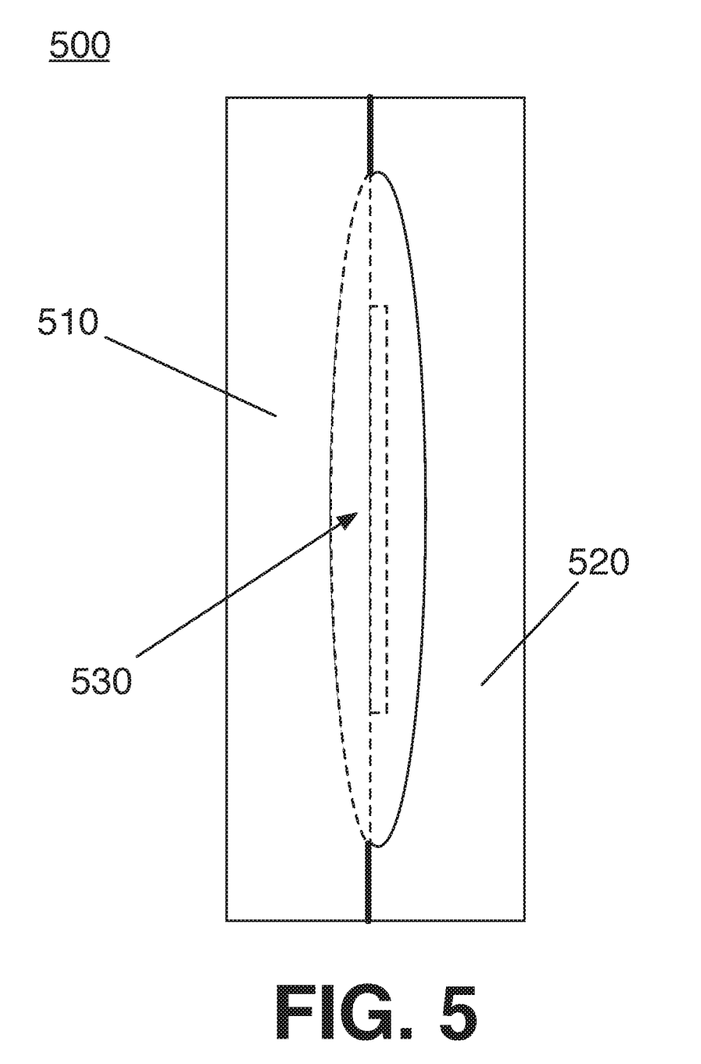
FIG. 5 illustrates an example second mold for manufacturing the lens of FIG. 3.

FIGS. 4 and 5 illustrate cut-away side views of mold that can be implemented to form a lens as described herein. In particular, FIG. 4 illustrates a mold 400 that can be implemented to form a first lens half (e.g., partial lens blank 320, or the like) while FIG. 5 illustrates a mold 500 that can be implemented to form a second lens half (e.g., backside lens portion 330, or the like) onto the first lens half, thereby embedding an HOE (e.g., the HOE 310, or the like) between the lens halves and forming the complete lens (e.g., the lens 300, or the like).

Turning more particularly to FIG. 4, the mold 400 comprises a first mold half 410 and a second mold half 420. The mold halves 410 and 420 can be combined to form a cavity 430. The cavity 430 can be filled with lens material (described in greater detail below) to form a partial lens blank. For example, the cavity 430 can be filed with material and the material cured to form the lens half 320. It is important to note, that the mold 400 can include ports (not shown) to fill the cavity with material. For example, the mold 400 can include ports to fill the cavity 430 via injection and/or casting. Furthermore, the mold 400 can include a registration cavity 440 to form a registration mark (e.g., refer to FIG. 8) to be used to align the HOE 310 onto the partial lens blank 320.

Turning more particularly to FIG. 5, the mold 500 comprises a first mold half 510 and a second mold half 520. The mold halves 510 and 520 can be combined to form a cavity 530. The partial lens blank and the HOE can be placed into the cavity 530 and the cavity 530 filled with lens material (described in greater detail below) to form a backside lens portion onto the partial lens blank, thereby embedding the HOE between the lens halves. For example, the partial lens blank 320 and HOE 310 can be placed into the cavity 530. It is noted, that the cavity 530 can be sized to accommodate the partial lens blank 320, the HOE 310, and have space to accept (e.g., via injecting, casting, or the like) material. As such, the cavity 530 can be filed with material to form the lens half 330 on the lens half 320. In this manner, the HOE 310 can be embedded between lens halves 320 and 330 and the complete lens 300 formed. It is important to note, that the mold 500 can include ports (not shown) to fill the cavity with material. For example, the mold 500 can include ports to fill the cavity 530 via injection and/or casting.

It is important to note, that the shape of the lens halves and the molds depicted herein are given for clarity of presentation only and not to be limiting. Furthermore, it is worthy to note, that the final lens shape may be different than the shape of the cavities 430 and/or 530. In particular, the lens halves can be formed in the cavities and then the complete lens 300 trimmed and/or contoured to have a final shape.

Figure 6:
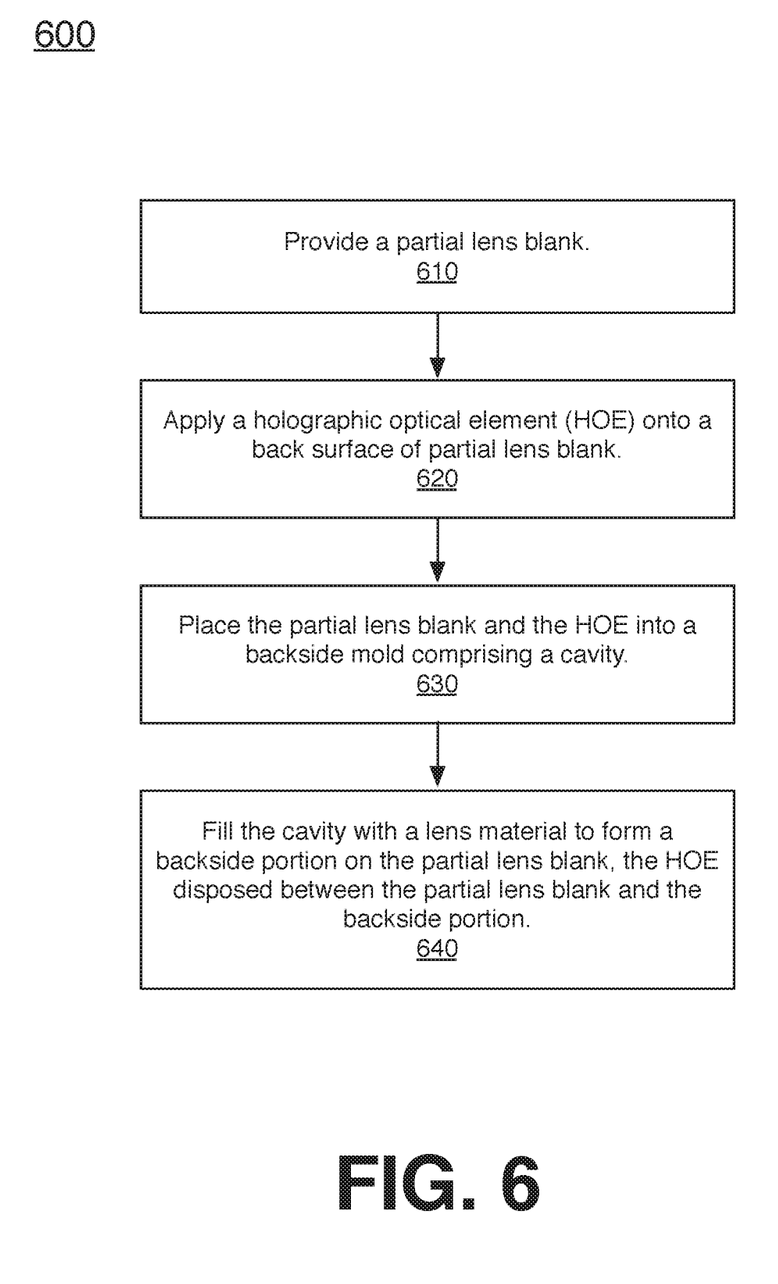
FIG. 6 illustrate an example logic flow.

FIG. 6 depicts a logic flow 600 for manufacturing a lens according to at least one example of the present disclosure. In some examples, the logic flow 600 can be implemented to manufacture the lens 300, for example, using molds 400 and 500. The logic flow 600 is described with reference to the lens 300 and the molds 400 and 500 for purposes of illustration only and not to be limiting. The logic flow 600 may begin at block 610. At block 610 "provide a partial lens blank" a partial lens blank is provided. For example, the partial lens blank 320 can be provided. In some examples, the partial lens blank 320 can be formed in a mold (e.g., the mold 400) and provided. For example, the mold 400 can be filled (e.g., injected, cast, or the like) with material and the material cured to form the partial lens blank 320. In some examples, the mold 400 can be filled with a polymer material, such as, for example, polyurethane, Trivex, or CR39.

Continuing to block 620 "apply a holographic optical element (HOE) onto a back surface of the partial lens blank" an HOE is applied to a backside of the partial lens blank. For example, the HOE 310 can be applied to the backside of the lens blank 320. In some examples, the HOE 310 can be applied using an adhesive, such as, for example, a pressure sensitive adhesive. It is noted, as depicted and described in greater detail herein, that the HOE 310 can be applied over a portion, less than all, or the backside surface of the lens blank 320. Additionally, the HOE 310 can be aligned to a specific location, such as, for example, using registration marks (e.g., refer to FIG. 8).

Continuing to block 630 "place the partial lens blank and HOE into a backside mold comprising a cavity" the partial lens blank with the HOE applied can be placed in a backside mold (e.g., refer to FIG. 6) comprising a cavity. For example, the partial lens blank 320 with the HOE 310 applied can be placed in the cavity 530 of the mold 500. As noted above, the cavity 530 can be sized to accommodate the lens half 320, the HOE 310, and have space remaining to accept additional lens material. Continuing to block 640 "fill the cavity with a lens material to form a backside portion on the partial lens blank, the HOE embedded between the partial lens blank and the backside portion" the cavity can be filled with lens material to form a backside lens portion on the partial lens blank, thereby embedding the HOE between the lens halves. For example, the cavity 530 can be filled (e.g., via injecting, casting, or the like) with lens material to from the backside lens portion 330. In particular, the backside lens portion 330 can be formed on the partial lens blank 320 with the HOE 310 affixed to the lens blank 320, thereby embedding the HOE 310 between the lens halves 320 and 330.

Figure 7A:
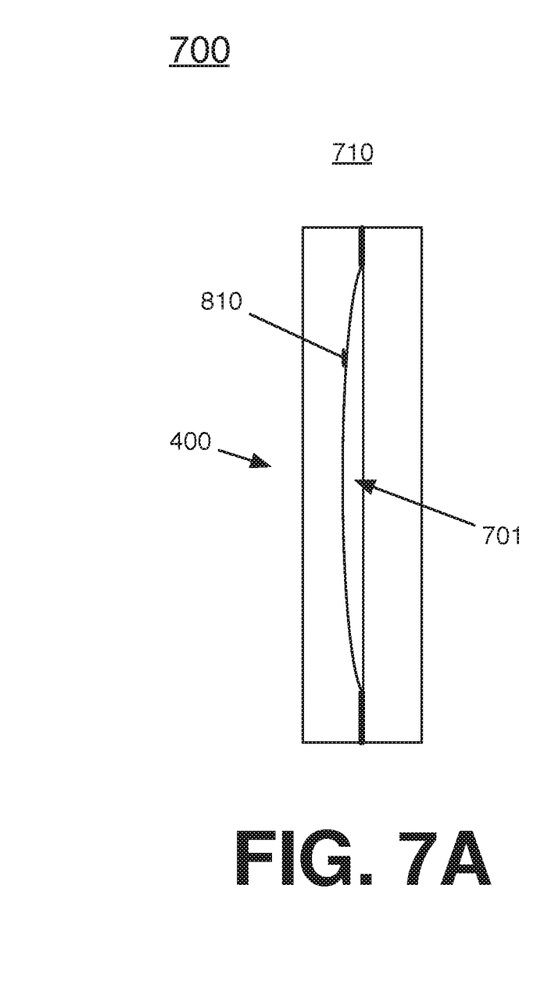
FIGS. 7A-7F illustrate an example technique.
Figure 7B:
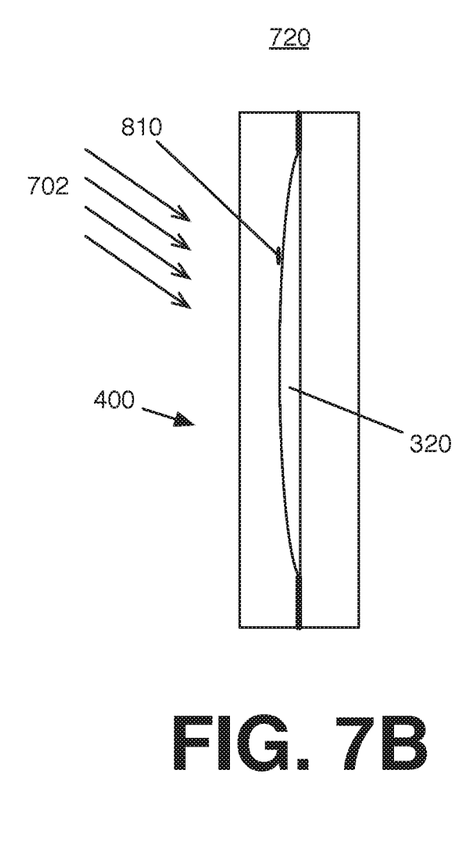

FIGS. 7A-7F depict an example technique 700 to form a lens. The technique 700 can be implemented to from the lens 300, for example, using molds 400 and 500. It is noted, the technique 700 is described with reference to the lens 300 and the molds 400 and 500 for purposes of clarity of presentation and not to be limiting. The technique 700 can begin at block 710. Turning to FIG. 7A and block 710, the mold 400 can be provided and the cavity 430 filled with lens material 701 (e.g., polymer, or the like). Turning to FIG. 7B and continuing to block 720, the lens material 701 can be cured via curing process 702 to form the partial lens blank 320. In some examples, curing process 702 can include application of radiation (e.g., light, or the like) to lens material 701. In some examples, curing process 702 can include application of heat to lens material 701. In some examples, curing process 702 can include a chemical reaction. It is noted, that formation of registration mark 810 is depicted in blocks 710 and 730. In some examples, a number of registration mark 810 can be formed, for example, in registration mark cavities 440, or the like.

Figure 7C:
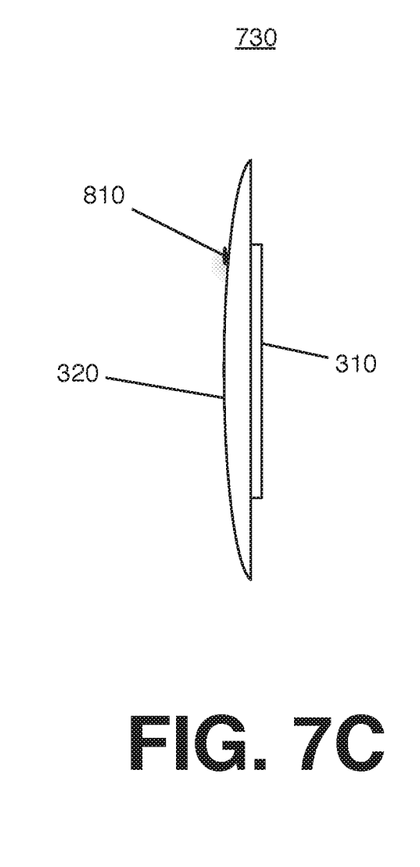

Turning to FIG. 7C and continuing to block 730, the HOE 310 can be applied to the partial lens blank 320. In some examples, the HOE 310 can be aligned to the registration mark 810. In some examples, the HOE 310 can be applied to the lens half 320 using a pressure sensitive adhesive.

Figure 7D:
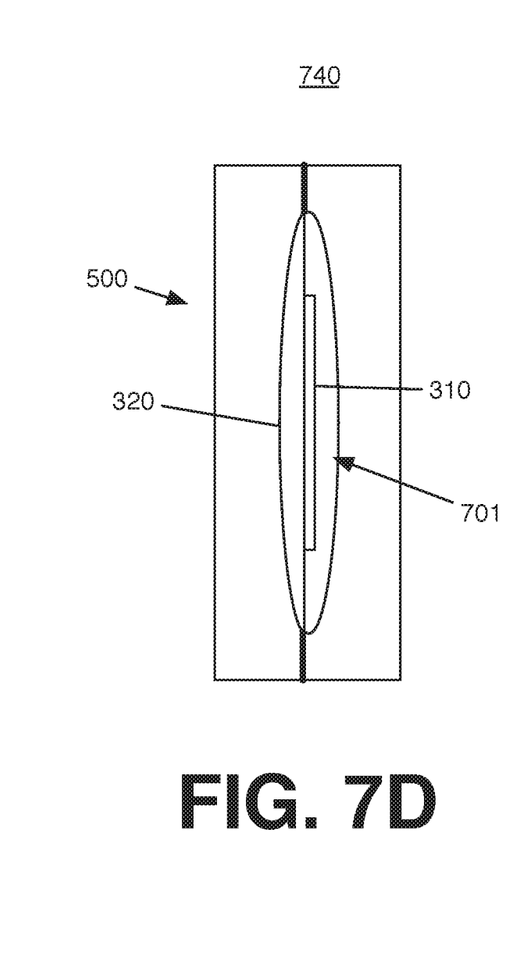
Figures 7E, 7F:
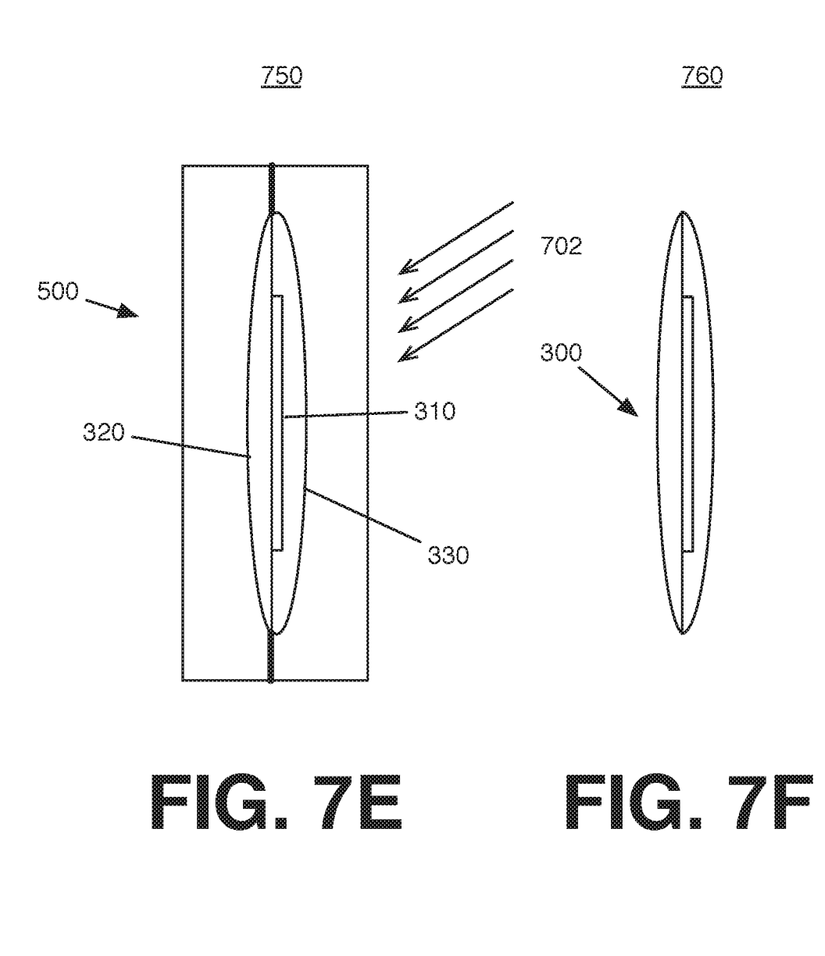

Turning to FIG. 7D and continuing to block 740 the partial lens blank 320 and the HOE 310 can be placed into mold 500. In particular the lens blank 320 with the HOE 310 affixed can be placed into the cavity 530 of the mold 500. As depicted, the lens blank 320 and HOE 310 do not occupy the entire space of the cavity 530. Accordingly, the balance of the cavity 530 not occupied by the lens blank 320 and the HOE 310 can be filled with lens material 701 (e.g., polymer, or the like). Turning to FIG. 7E and continuing to block 750, the lens material 701 can be cured via curing process 702 to form the backside lens portion 330, thereby embedding the HOE 310 between the lens halves 320 and 330. In some examples, curing process 702 can include application of radiation (e.g., light, or the like) to lens material 701. In some examples, curing process 702 can include application of heat to lens material 701. In some examples, curing process 702 can include a chemical reaction.

Turning to FIG. 7F and continuing to block 760, the lens halves 320 and 330 can be shaped, edge ground, polished, and/or the like to a final lens shape to form the complete lens 300 with the HOE embedded between lens halves 320 and 330. It is worthy to note, that the registration marks 810 can be removed during block 760 (e.g., by polishing, or the like) and/or can be removed prior to block 740. Examples are not limited in this context.

Figure 8:
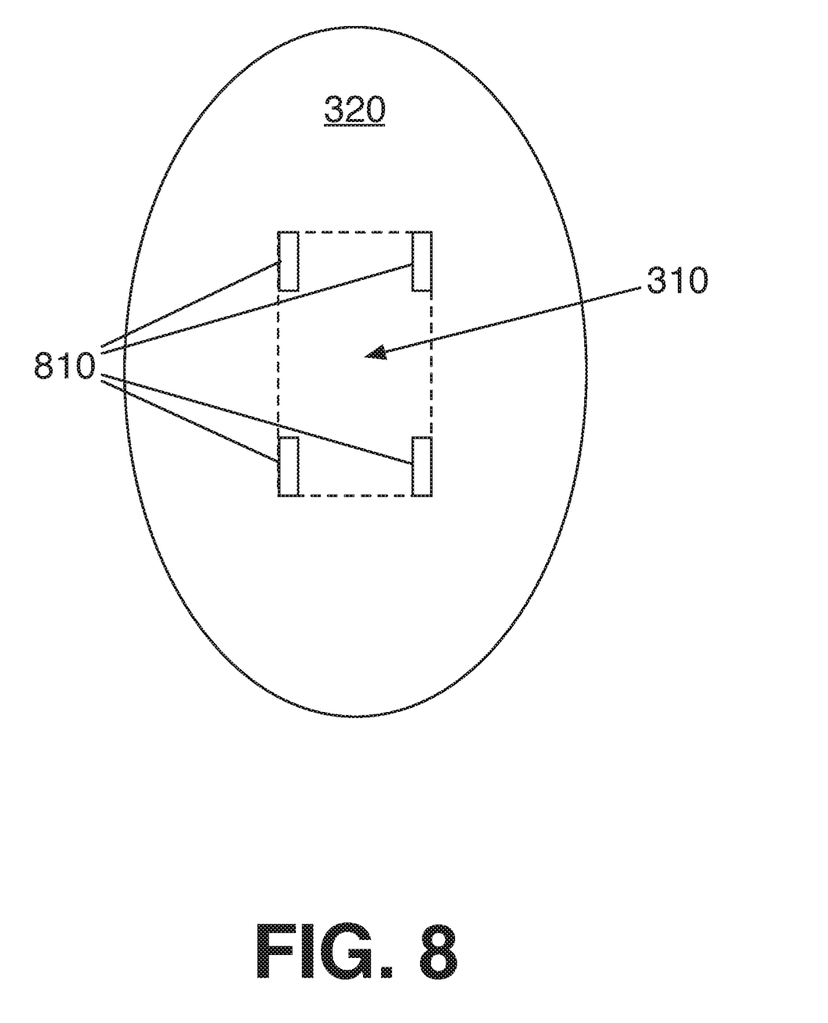
FIG. 8 illustrates example registration marks.

FIG. 8 illustrates a front perspective view of the partial lens blank 320, according to examples of the present disclosure. The lens blank 320 is depicted including a number of registration marks 810 disposed on a front surface of the lens blank 320. During manufacturing, the HOE 310 can be affixed to the back surface of the lens blank 320 and aligned to the registration marks 810 as depicted in this figure. It is noted, that the position of the registration marks and relative size of the lens blank 320 to the HOE 310 is given for purposes of illustration only and not to be limiting. Furthermore, the HOE 310 may not necessarily be centered within the lens blank 320 as depicted.

Figure 9:
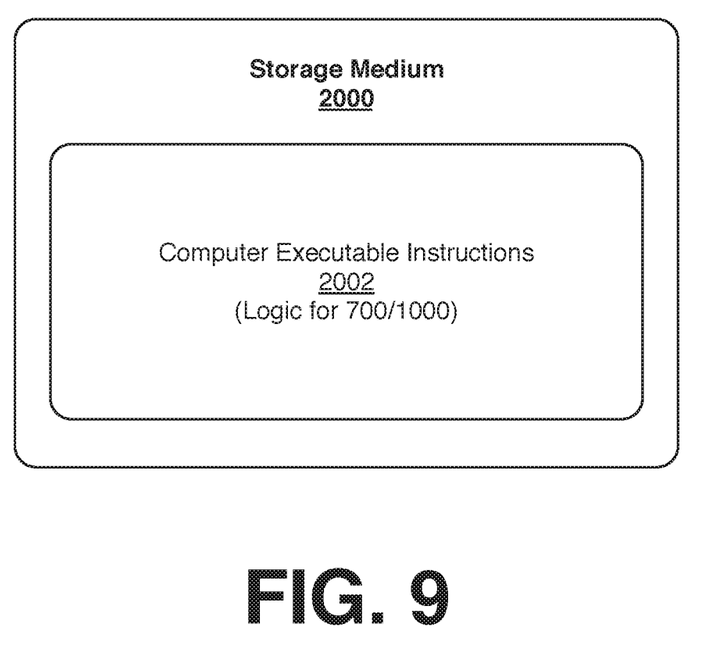
FIG. 9 illustrates an example computer readable medium.

FIG. 9 illustrates an embodiment of a storage medium 2000. The storage medium 2000 may comprise an article of manufacture. In some examples, the storage medium 2000 may include any non-transitory computer readable medium or machine readable medium, such as an optical, magnetic or semiconductor storage. The storage medium 2000 may store various types of computer executable instructions e.g., 2002). For example, the storage medium 2000 may store various types of computer executable instructions to implement technique 600. For example, the storage medium 2000 may store various types of computer executable instructions to implement technique 700.

Examples of a computer readable or machine readable storage medium may include any tangible media capable of storing electronic data, including volatile memory or non-volatile memory, removable or non-removable memory, erasable or non-erasable memory, writeable or re-writeable memory, and so forth. Examples of computer executable instructions may include any suitable type of code, such as source code, compiled code, interpreted code, executable code, static code, dynamic code, object-oriented code, visual code, and the like. The examples are not limited in this context.

Figure 10:
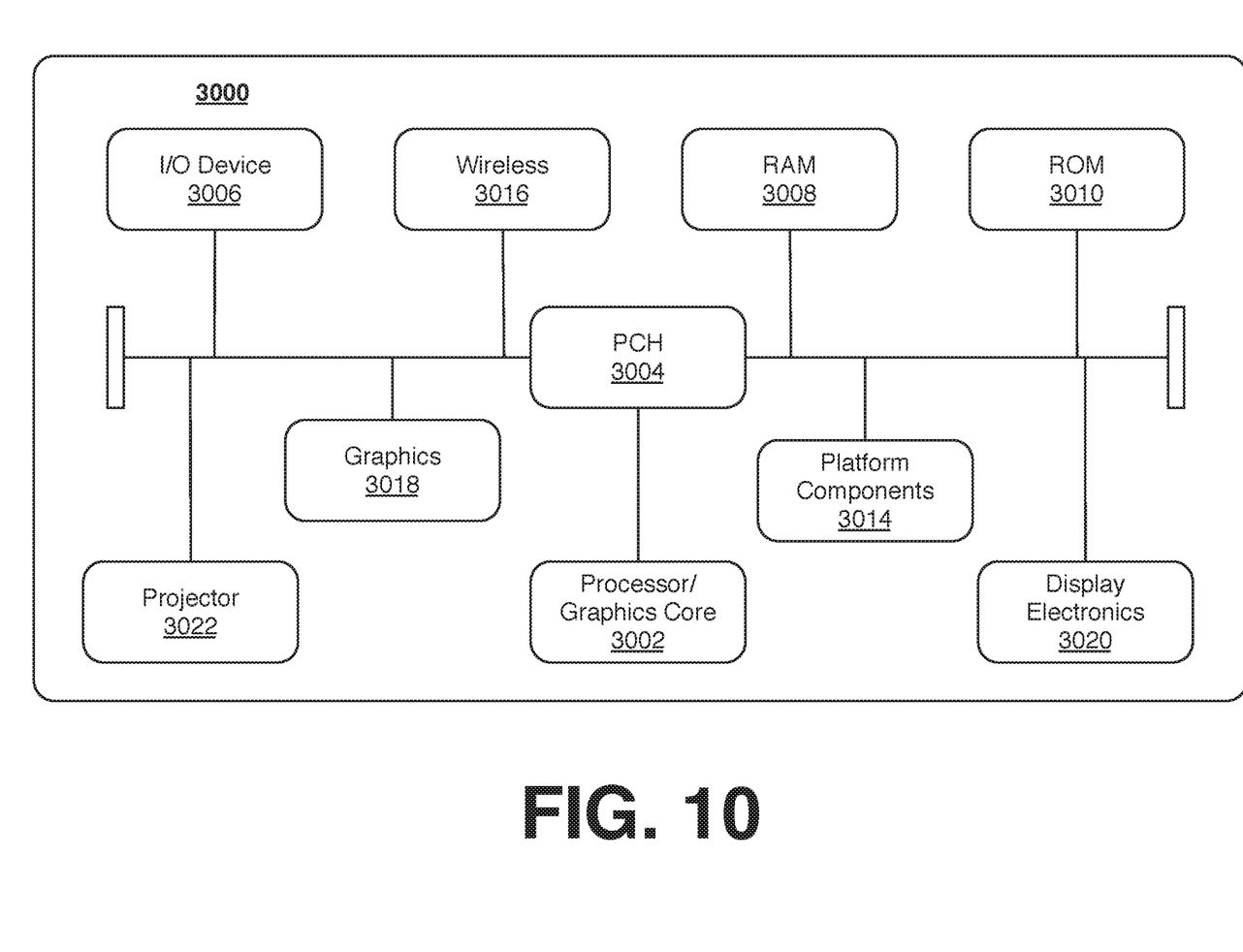
FIG. 10 illustrates a third example system.

FIG. 10 is a diagram of an exemplary system embodiment and in particular, depicts a platform 3000, which may include various elements. For instance, this figure depicts that platform (system) 3000 may include a processor/graphics core 3002, a chipset/platform control hub (PCH) 3004, an input/output (I/O) device 3006, a random access memory (RAM) (such as dynamic RAM (DRAM)) 3008, and a read only memory (ROM) 3010, display electronics 3020 (e.g., lens 300, or the like), projector 3022 (e.g., projector 110, or the like), and various other platform components 3014 (e.g., a fan, a cross flow blower, a heat sink, DTM system, cooling system, housing, vents, and so forth). System 3000 may also include wireless communications chip 3016 and graphics device 3018. The embodiments, however, are not limited to these elements.

As depicted, I/O device 3006, RAM 3008, and ROM 3010 are coupled to processor 3002 by way of chipset 3004. Chipset 3004 may be coupled to processor 3002 by a bus 3012. Accordingly, bus 3012 may include multiple lines.

Processor 3002 may be a central processing unit comprising one or more processor cores and may include any number of processors having any number of processor cores. The processor 3002 may include any type of processing unit, such as, for example, CPU, multi-processing unit, a reduced instruction set computer (RISC), a processor that have a pipeline, a complex instruction set computer (CISC), digital signal processor (DSP), and so forth. In some embodiments, processor 3002 may be multiple separate processors located on separate integrated circuit chips. In some embodiments processor 3002 may be a processor having integrated graphics, while in other embodiments processor 3002 may be a graphics core or cores.

Some embodiments may be described using the expression "one embodiment" or "an embodiment" along with their derivatives. These terms mean that a particular feature, structure, or characteristic described in connection with the embodiment is included in at least one embodiment. The appearances of the phrase "in one embodiment" in various places in the specification are not necessarily all referring to the same embodiment. Further, some embodiments may be described using the expression "coupled" and "connected" along with their derivatives. These terms are not necessarily intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other. Furthermore, aspects or elements from different embodiments may be combined.

It is emphasized that the Abstract of the Disclosure is provided to allow a reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

The disclosure now turns to providing examples implementations.

Example 1

A method to manufacture a wearable display lens, comprising: providing a partial lens blank, the partial lens blank comprising a front surface and a back surface; applying a holographic optical element (HOE) to a portion of the back surface of the partial lens blank; placing the partial lens blank and the HOE into a backside mold, the backside mold comprising a cavity, the HOE disposed within the cavity; and filling the cavity with a lens material to form a backside lens portion on the partial lens blank, wherein the HOE is embedded between the partial lens blank and the backside lens portion.

Example 2

The method of example 1, the HOE comprising a first area and the back surface of the partial lens blank comprising a second area larger than the first area.

Example 3

The method of example 2, wherein the first area is between 4 and 12 times smaller than the second area.

Example 4

The method of any one of examples 1 to 3, filling the cavity comprising casting the lens material into the cavity.

Example 5

The method of any one of examples 1 to 3, filling the cavity comprising injecting the lens material into the cavity.

Example 6

The method of example 1, comprising applying at least one of heat or light to cure the lens material.

Example 7

The method of example 1, the partial lens blank comprising at least one registration mark, the method comprising aligning the HOE on the back surface of the partial lens blank based on the at least one registration mark.

Example 8

The method of example 1, comprising shaping the partial lens blank and the backside lens portion to an eyewear lens shape.

Example 9

The method of example 1, comprising filling a cavity in a frontside mold with the lens material to form the partial lens blank.

Example 10

The method of example 1, wherein the lens material comprises polymer.

Example 11

The method of example 8, wherein the lens material comprises polyurethane, Trivex, or CR39.

Example 12

The method of example 1, comprising applying the HOE to the portion of the back surface of the partial lens blank via an adhesive.

Example 13

A lens manufactured according to the method of any one of examples 1 to 3 or examples 6 to 12.

Example 14

A projection system lens, comprising: a first lens blank; a holographic optical element (HOE) affixed to a portion of the back surface of the first lens blank; a second lens blank formed on the first lens blank, the HOE embedded between the first and the second lens blank.

Example 15

The projection system lens of example 14, the first lens blank having a first area and the HOE having a second area less than the first area.

Example 16

The projection system lens of example 15, the first area corresponding to a viewable area of the lens.

Example 17

The projection system lens of example 15, wherein the second area is between 4 and 12 times smaller than the first area.

Example 18

The projection system lens of example 14, wherein the first and second lens blanks comprise polymer.

Example 19

The projection system lens of any one of examples 14 to 18, wherein the projection surface is a glasses lens, a goggle lens, or a helmet visor.

Example 20

A system for projecting an image, the system comprising: a frame; a lens coupled to the frame, the lens comprising a holographic optical element (HOE) embedded within the lens; and a projector coupled to the frame, the projector to project light onto the HOE.

Example 21

The system of example 20, the lens comprising: a first lens blank, the HOE affixed to a portion of the back surface of the first lens blank; and a second lens blank formed on the first lens blank, the HOE embedded between the first and the second lens blank.

Example 22

The system of example 20, the first lens blank having a first area and the HOE having a second area less than the first area.

Example 23

The system of example 22, the first area corresponding to a viewable area of the lens.

Example 24

The system of example 22, wherein the second area is between 4 and 12 times smaller than the first area.

Example 25

The system of example 20, wherein the lens comprise polymer.

Example 26

The system of example 20, the HOE to reflect light incident on the HOE from a first angle and direction to project an image to an exit pupil.

Example 27

The system of any one of examples 20 to 26, wherein the lens is a glasses lens, a goggle lens, or a helmet visor.

Example 28

The system of example 27, wherein the frame is glasses, goggles, or a helmet.

Example 29

The system of any one of examples 20 to 26, comprising a battery electrically coupled to the projector.

Example 30

The system of any one of examples 20 to 26, comprising a graphic processor to receive an image information element to include an indication of an image and the send a display control signal to the projector to cause the projector to project one or more pixels corresponding to the image onto the HOE.

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims. The detailed disclosure now turns to providing examples that pertain to further embodiments. The examples provided below are not intended to be limiting.

What is claimed is:

1. A projection system lens, comprising:
 a first lens blank comprising a plurality of registration marks on a front surface of the first lens blank;
 a pre-formed holographic optical element (HOE), the pre-formed HOE affixed to a portion of a back surface of the first lens blank and aligned according to the plurality of registration marks; and
 a second lens blank formed on the back surface of the first lens blank over the pre-formed HOE, the pre-formed HOE embedded between the first and the second lens blank, wherein the plurality of registration marks are removable from the front surface of the first lens blank.

2. The projection system lens of claim 1, the first lens blank having a first area and the HOE having a second area less than the first area.

3. The projection system lens of claim 2, the first area corresponding to a viewable area of the lens.

4. The projection system lens of claim 2, wherein the second area is between 4 and 12 times smaller than the first area.

5. The projection system lens of claim 1, wherein the projection system lens is a glasses lens, a goggle lens, or a helmet visor.

6. The projection system lens of claim 1, wherein the HOE is pre-formed to selectively reflect light incident on the lens from an entrance pupil to an exit pupil.

7. The projection system lens of claim 6, wherein the entrance pupil and exit pupil are disposed on the same side on the lens.

8. A system for projecting an image, the system comprising:
 a frame;
 a lens coupled to the frame, the lens comprising:
  a first lens blank comprising a plurality of registration marks on a front surface of the first lens blank;
  a pre-formed holographic optical element (HOE), the pre-formed HOE affixed to a portion of a back surface of the first lens blank and aligned according to the plurality of registration marks formed on the lens; and
  a second lens blank formed on the back surface of the first lens blank over the pre-formed HOE, the pre-formed HOE embedded between the first and the second lens blank, wherein the plurality of registration marks are removable from the front surface of the first lens blank; and
 a projector coupled to the frame, the projector to project light onto the HOE.

9. The system of claim 8, the first lens blank having a first area and the HOE having a second area less than the first area.

10. The system of claim 9, the first area corresponding to a viewable area of the lens.

11. The system of claim 9, wherein the second area is between 4 and 12 times smaller than the first area.

12. The system of claim 8, the HOE to reflect light incident on the HOE from a first angle and direction to project an image to an exit pupil.

13. The system of claim 8, wherein the lens is a glasses lens, a goggle lens, or a helmet visor.

14. The system of claim 13, wherein the frame is glasses, goggles, or a helmet.

15. The system of claim 8, wherein the HOE is pre-formed to selectively reflect light incident on the lens from an entrance pupil to an exit pupil.

16. The system of claim 15, wherein the entrance pupil and exit pupil are disposed on the same side on the lens.

* * * * *